United States Patent
Hsu (10) Patent No.: US 10,992,170 B2
(45) Date of Patent: Apr. 27, 2021

(54) POWER SUPPLY APPARATUS AND POWER SUPPLYING METHOD THEREOF

(71) Applicant: Wiwynn Corporation, New Taipei (TW)

(72) Inventor: Kuan-Wei Hsu, New Taipei (TW)

(73) Assignee: Wiwynn Corporation, New Taipei (TW)

(*) Notice: Subject to any disclaimer, the term of this patent is extended or adjusted under 35 U.S.C. 154(b) by 72 days.

(21) Appl. No.: 16/252,714

(22) Filed: Jan. 21, 2019

(65) Prior Publication Data
US 2020/0144854 A1 May 7, 2020

(30) Foreign Application Priority Data

Nov. 7, 2018 (TW) .................................. 107139415

(51) Int. Cl.
*H02J 9/06* (2006.01)
*H02M 1/42* (2007.01)
*H02H 7/10* (2006.01)

(52) U.S. Cl.
CPC .............. *H02J 9/061* (2013.01); *H02H 7/10* (2013.01); *H02J 9/06* (2013.01); *H02J 9/062* (2013.01); *H02M 1/4225* (2013.01); *H02J 9/068* (2020.01)

(58) Field of Classification Search
CPC ........ H02J 2009/068; H02J 9/06; H02J 9/068; H02J 9/061; H02J 9/062; H02M 1/4225; H02M 3/1582; H02H 7/10
USPC ........... 363/16, 89; 307/82, 43, 45; 323/211, 323/207
See application file for complete search history.

(56) References Cited

U.S. PATENT DOCUMENTS

| 8,130,524 B2 | 3/2012 | Lee et al. |
| 9,337,689 B2 | 5/2016 | Liu et al. |
| 2010/0072819 A1 | 3/2010 | Lee et al. |
| 2013/0307489 A1* | 11/2013 | Kusch ............... B60L 58/21 320/162 |
| 2014/0077602 A1 | 3/2014 | Liu et al. |

FOREIGN PATENT DOCUMENTS

| CN | 103683468 | 3/2014 |
| TW | 201014132 | 4/2010 |

OTHER PUBLICATIONS

"Office Action of Taiwan Counterpart Application", dated Jun. 17, 2019, p. 1-p. 9.
"Office Action of China Counterpart Application", dated Jan. 25, 2021, pp. 1-10.

* cited by examiner

*Primary Examiner* — Arnold M Kinkead
(74) *Attorney, Agent, or Firm* — JCIPRNET (57) ABSTRACT

A power supply apparatus and a power supplying method thereof are provided. The power supply apparatus includes a power switch and a supplied power generator. The power switch respectively receives a first power and a second power through a first switch and a second switch. The supplied power generator converts the first power or the second power to generate a supplied power. When the supplied power generator judges the first power being cut off, during a first time period, the first switch is cut off and a voltage converting operation of the supplied power generator is stopped. During a second time period, the second switch is turned on, and the voltage converting operation of the supplied power generator is restarted after the second switch being turned on.

15 Claims, 8 Drawing Sheets

FIG. 6

POWER SUPPLY APPARATUS AND POWER SUPPLYING METHOD THEREOF

CROSS-REFERENCE TO RELATED APPLICATION

This application claims the priority benefit of Taiwan application serial no. 107139415, filed on Nov. 7, 2018. The entirety of the above-mentioned patent application is hereby incorporated by reference herein and made a part of this specification.

BACKGROUND

Technical Field

The disclosure relates to a power supply apparatus and a power supplying method thereof, and particularly to a power supply apparatus of an uninterruptible power system and a power supplying method thereof.

Description of Related Art

In the known technical field, a power supply apparatus of an uninterruptible power system performs a switching operation between a main power and an auxiliary power through an Automatic Transfer Switch (ATS). Please refer to a circuit diagram of an ATS shown by FIG. 1. A known ATS 100 includes a plurality of switches SWA1-SWA4, wherein SWA1 and SWA2 are respectively coupled to fire lines L1 and L2, and switches SWA3 and SWA4 are respectively coupled to neutral lines N1 and N2. The fire line L1, the neutral line N1 and a ground line FG1 are used to receive a power VP1, and the fire line L2, the neutral line N2 and a ground line FG2 are used to receive a power VP2.

Figure 1:
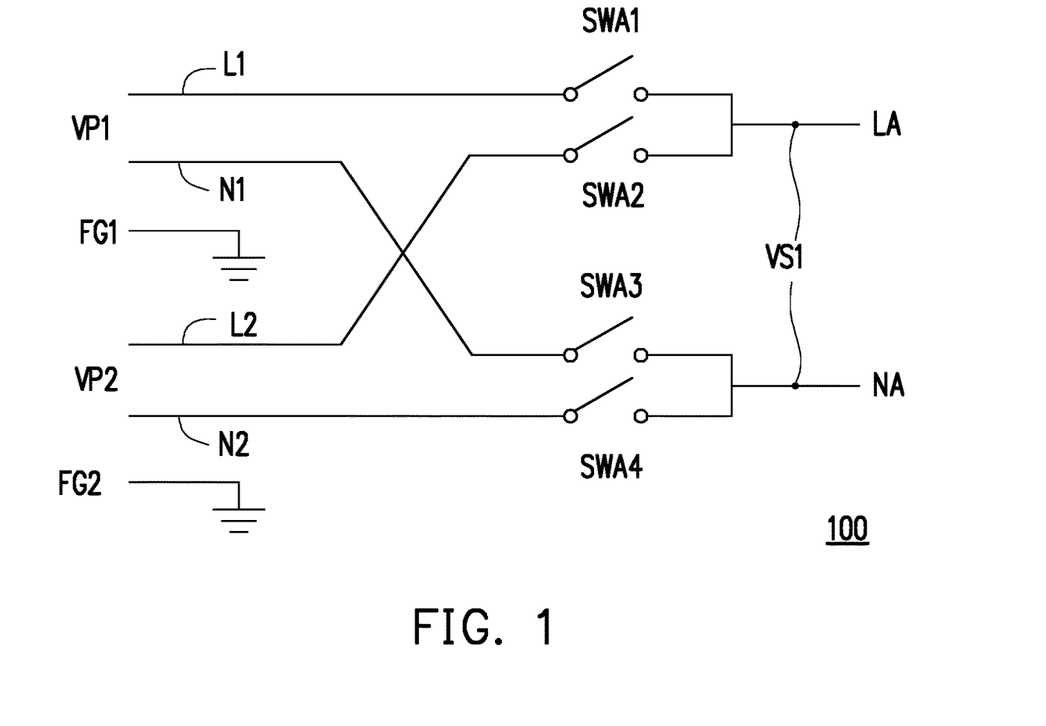
FIG. 1 shows a circuit diagram of an Automatic Transfer Switch.

When the power VP1 exists, the switches SWA1 and SWA3 are turned on, and the switches SWA2 and SWA4 are cut off, and the power VP1 is provided to generate a selected power VS1 between a fire line LA and a neutral line NA. When the power VS1 is cut off, the switches SWA1 and SWA3 are cut off, and the switches SWA2 and SWA4 are turned on. The ATS 100 changes to choose the power VP2 as the selected power VS1 to maintain the power supplying operation.

It is worth noting that during the process when the switches SWA1-SWA4 are performing the switching operation, the current existing in the circuit may cause the occurrence of an electric arc situation. In addition, the bouncing phenomenon during the switching process of the switches SWA1-SWA4 may generate high frequency noise correspondingly and affect the operation of the switches themselves and peripheral circuits.

SUMMARY

The disclosure provides a power supply apparatus and power supplying method thereof to effectively decrease the electric arc phenomenon generated during the switching of powers and to avoid impacts generated by switch bounces.

A power supply apparatus of the disclosure includes a power switch and a supplied power generator. The power switch respectively receives a first power and a second power through a first switch and a second switch. The supplied power generator is coupled to the power switch, receiving and performing a voltage converting operation to a first power or a second power to generate supplied power; wherein, when the first power judges the supplied power being cut off, during a first time period, the first switch is cut off and the supplied power generator stops the voltage converting operation. During a second time period, the second switch is turned on, and the supplied power generator restarts the voltage converting operation to generate power after the second switch is turned on. The first time period is before the second time period.

The power supplying method of the disclosure includes: providing a power switch to respectively receive a first power and a second power through a first switch and a second switch; providing a supplied power generator to perform a voltage converting operation to the first power or the second power to generate power; when the first power judges the supplied power being cut off, during a first time period, the first switch is cut off, making the supplier power generator stop the voltage converting operation; and, during the second time period after the first time period, the second switch is turned on, and after the second switch is turned on, a supplied power generator is provided to restart the voltage converting operation to generate the supplied power.

Based on the above, during the switching process of the first power and the second power, based on the voltage converting operation of the supplied power generator has been stopped, the power supplier of the disclosure may effectively prevent the electric arc phenomenon from happening and avoid the impacts generated by switch bounces, so as to provide the work efficiency of the power supplier.

In order to make the features and advantages of the disclosure mentioned above more understandable, embodiments will be described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 2:
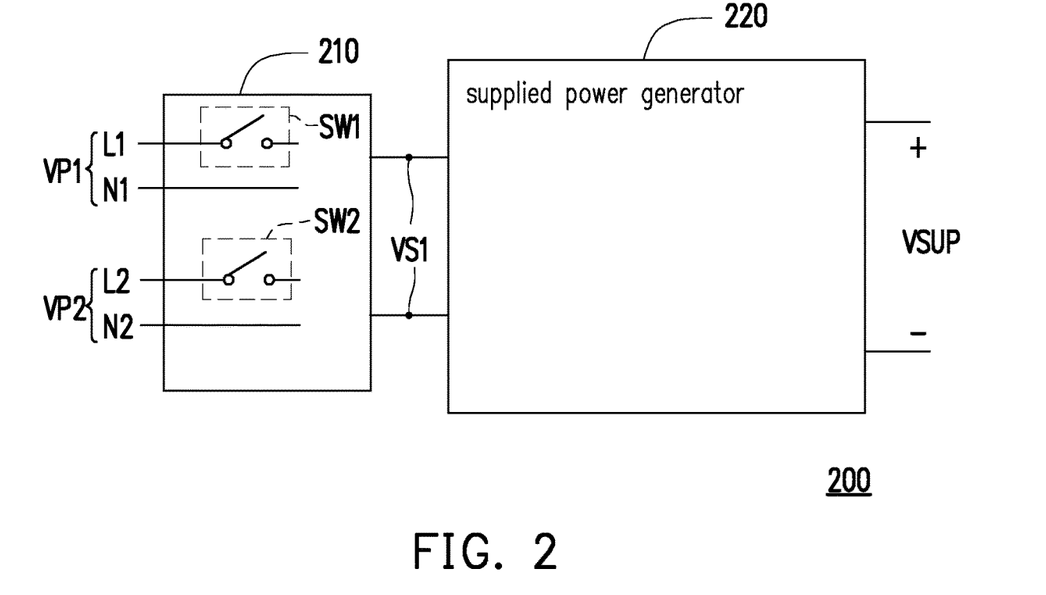
FIG. 2 shows a schematic view of a power supply apparatus of an embodiment of the disclosure.

Please refer to FIG. 2. FIG. 2 shows a schematic view of a power supply apparatus of an embodiment of the disclosure. A power supply apparatus 200 includes a power switch 210 and a supplied power generator 220. The power switch 210 may be an Automatic Transfer Switch (ATS) and has switches SW1 and SW2. The switch SW1 is coupled to a fire line L1, the switch SW2 is coupled to a fire line L2. The power switch 210 receives a power VP1 through the fire line L1 and a neutral line N1, and the power switch 210 receives a power VP2 through a fire line L2 and a neutral line N2; wherein the power switch 210 receives the power VP1 through the switch SW1 to generate a selected power VS1 or receives the power VP2 through the switch SW2 to generate the selected power VS1.

The supplied power generator 220 is coupled to the power switch 210. The supplied power generator 220 receives the selected power VS1 and performs a voltage converting operation on the selected power VS1 to generate a power VSUP. Specifically, when the SW1 is turned on (the switch SW2 is cut off), the supplied power generator 220 performs the voltage converting operation on the selected power VS1 which equals to the power VP1 to generate the power VSUP. Comparatively, when the switch SW2 is turned on (the switch SW1 is cut off), the supplied power generator 220 performs the voltage converting operation on the selected power VS1 which equals to the power VP2 to generate the power VSUP.

The abovementioned voltage converting operation may be a boost voltage converting operation. In other embodiments of the disclosure, the abovementioned voltage converting operation may be buck voltage conversion or a fly-back voltage conversion. There is no specific limitation to the voltage converting operations.

Regarding the operation details of the power supply apparatus 200, when the power VP1 exists, the power switch 210 may receive the power VP1 through turning on the switch SW1 (cutting off the SW2) and provide the power VP1 as the selected power VS1. In the embodiment of the disclosure, the power VP1 may be a main power, and the power VP2 may be an auxiliary power.

When the power VP1 is cut off, the power switch 210 may detect a disappearing state of the power VP1, and, during a first time period, make the first switch being cut off and make the voltage converting operation of the supplied power generator 220 stop. Then, during a second time period after the first time period, the power switch 210 may make the switch SW2 turn on, receive the power VP2 and provide the power VP2 as the selected power VS1. It is worth noting that, based on the voltage converting operation of the supplied power generator 220 is stopped, the current of the switch SW2 almost equals to zero. Thus, the switching operation of the switch SW2 may achieve the zero-current switch without generating an electric arc condition. In addition, the bouncing phenomenon generated by the switching operations of the switch SW2 may not cause the high frequency noise that is enough to affect circuits operations. Thus, a work efficiency of the power supply apparatus 200 is maintained.

Figure 3:
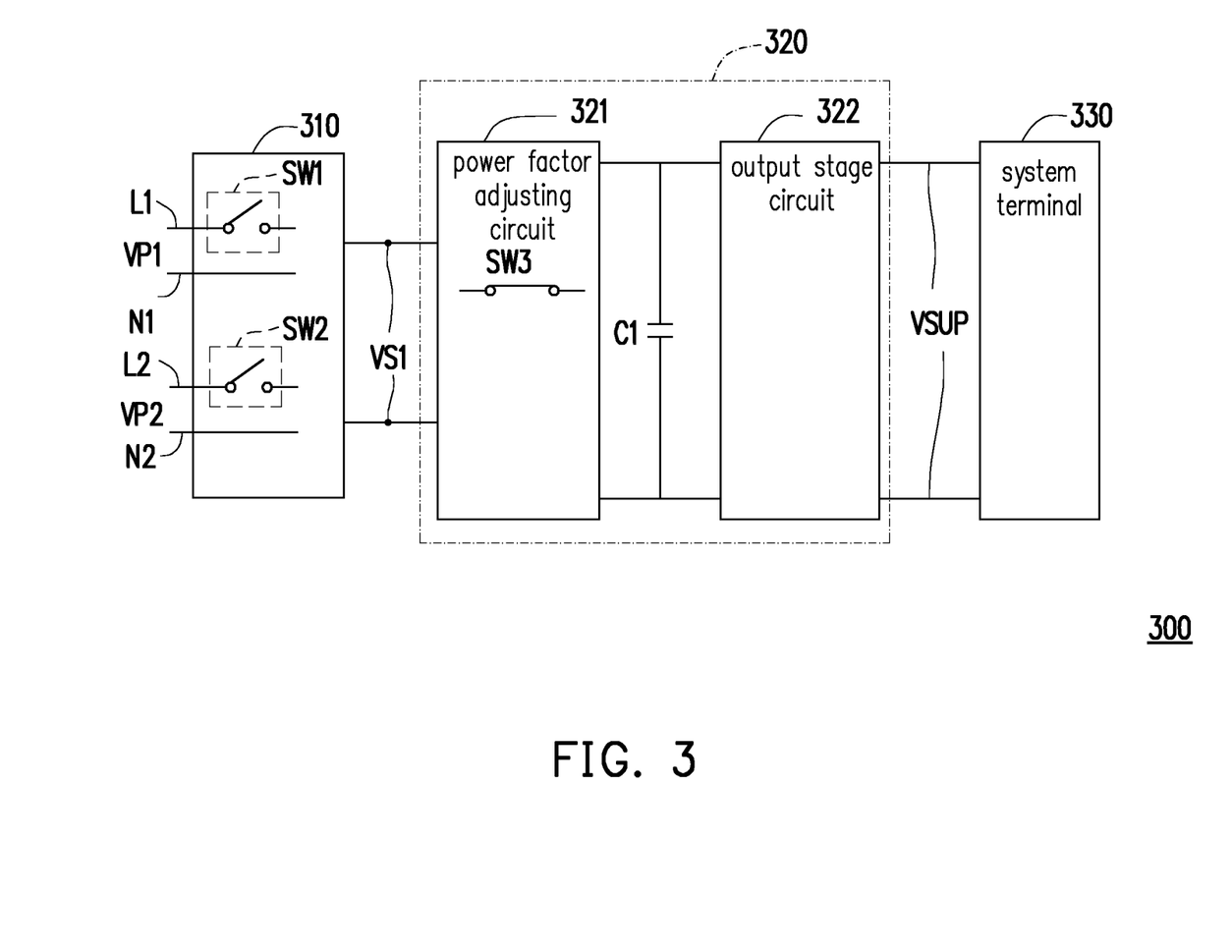
FIG. 3 shows a schematic view of a power supply apparatus of another embodiment of the disclosure.

Please refer to FIG. 3 for the following disclosure. FIG. 3 shows a schematic view of the power supply apparatus of another embodiment of the disclosure. A power supply apparatus 300 includes a power switch 310 and a supplied power generator 320. The power switch 310 has a switch SW1 and a switch SW2. The switch SW1 is coupled to a fire line L1, and the switch SW2 is coupled to a fire line L2. The power switch 310 receives a power VP1 through the fire line L1 and a neutral line N1, and the power switch 310 receives a power VP2 through the fire line L2 and a neutral line N2; wherein the power switch 310 receives the power VP1 through the switch SW1 to generate a selected power VS1 or receive the power VP2 through the switch SW2 to generate selected the power VS1. The supplied power generator 320 includes a power factor adjusting circuit 321, a capacitor C1 and an output stage circuit 322. The power supply apparatus 300 is used to provide a supplied power VSUP to a system terminal 330.

In addition, the power factor adjusting circuit 321 has a switch SW3. The switch SW3 is a power switch used to turn on and cut off alternately to perform a voltage converting operation. The capacitor C1 is used to save the electric energy of the supplied power VSUP generated by the supplied power generator 320. The output stage circuit 322 may be an output buffer known by persons skilled in the art to provide the supplied power VSUP to the system terminal 330.

Figure 4A:
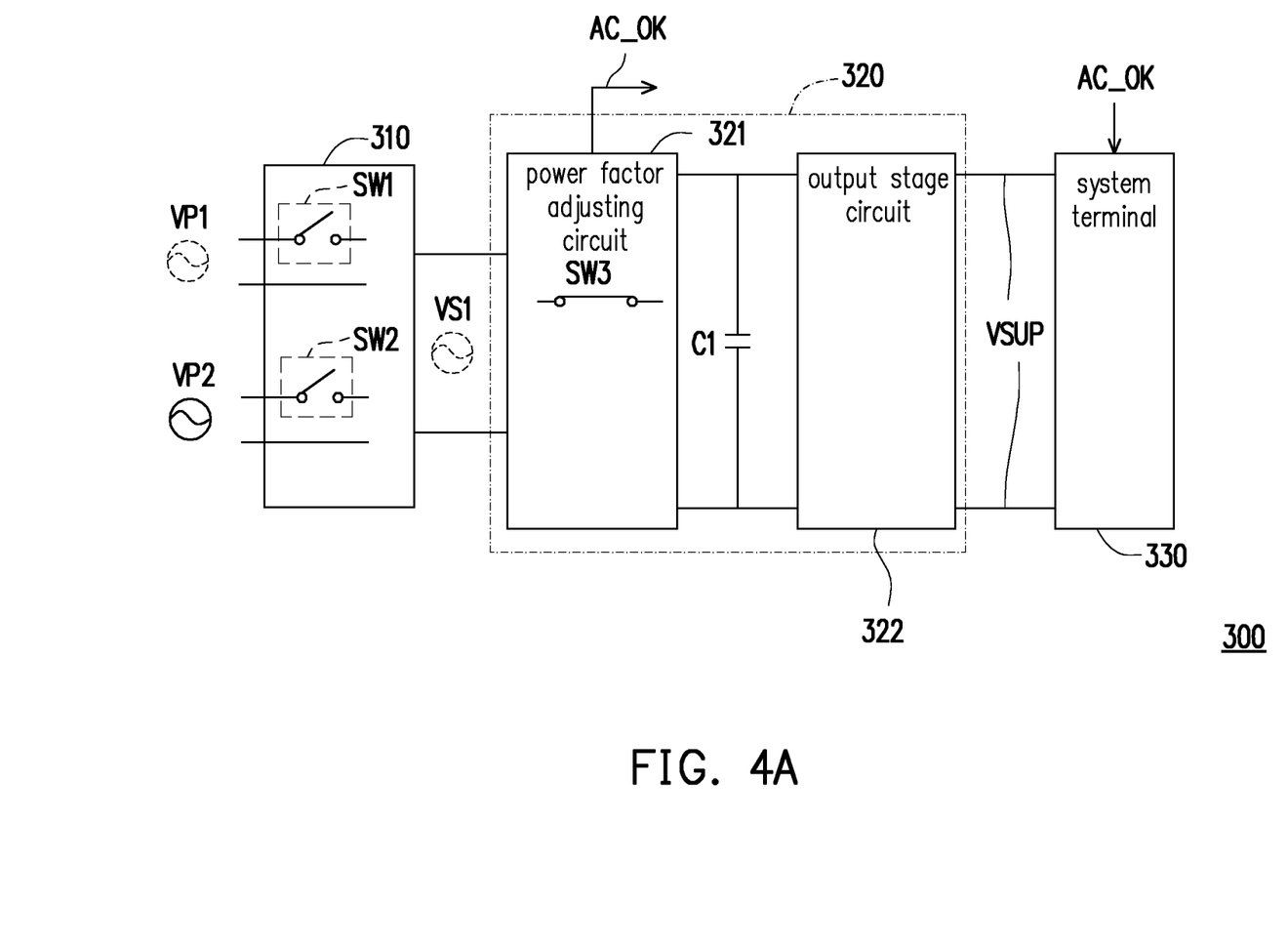
FIG. 4A to FIG. 4E shows a schematic view of an operation way of a power supply apparatus of the disclosure.

Regarding the operation details of the power supply apparatus 300, please refer to the schematic view of the operation way of the power supply apparatus shown by FIG. 4A to FIG. 4E. In FIG. 4A, the power switch 310 judges the power VP1 as being cut off, and, during a first time period, the power switch 310 cuts off the switch SW1 which coupled to the power VP1. At the same time, the switch SW2 is also in a cut-off state. Therefore, the selected power VS1 provided by the power switch 310 is in a cut-off state.

Correspondingly, when the power VS1 is cut off, the power factor adjusting circuit 321 in the supplied power generator 320 may transmit a power abnormal signal AC_OK; wherein the power abnormal signal AC_OK may be transmitted to the system terminal 330 or other outer electronic apparatuse(s).

Figure 4B:
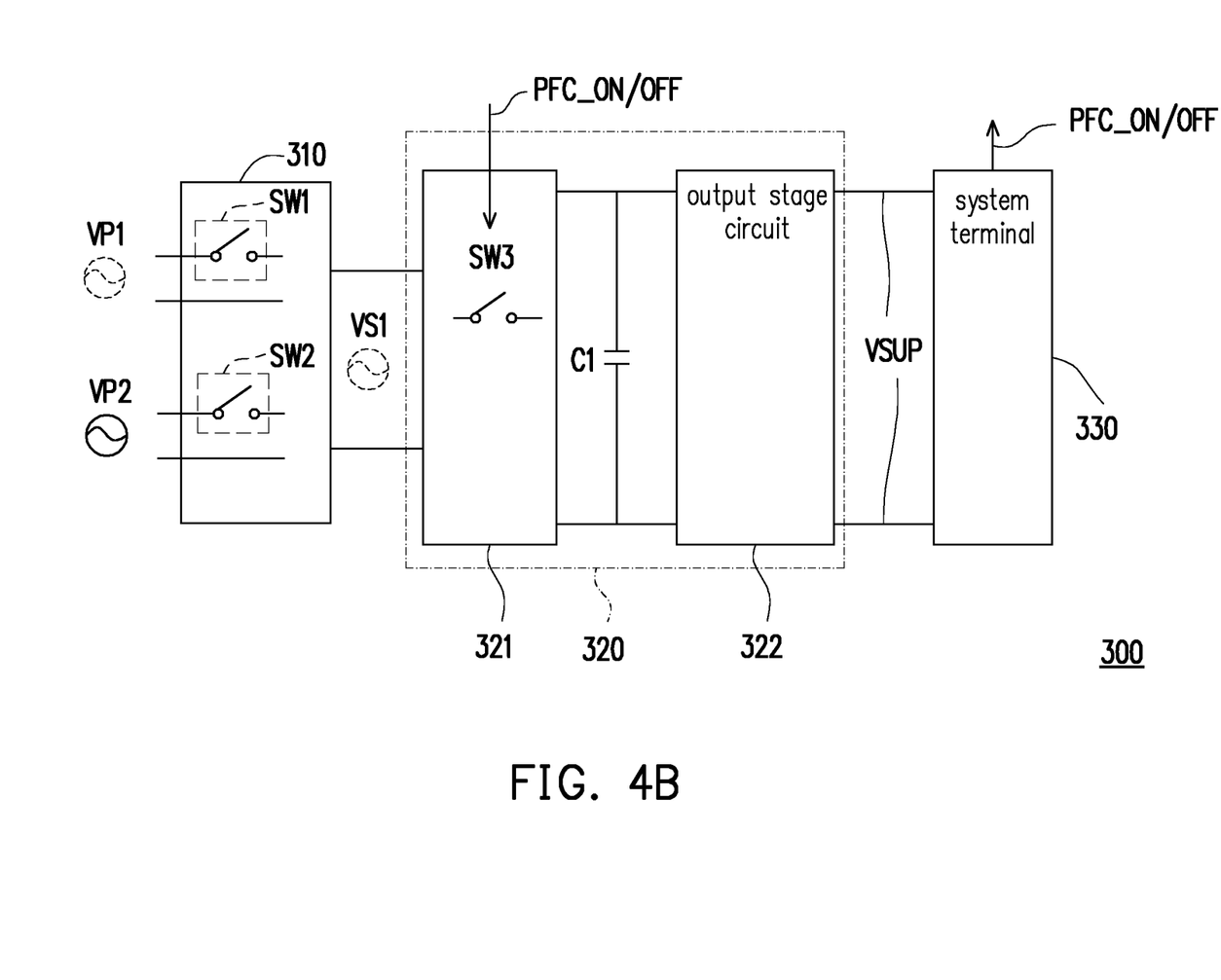

Further, in FIG. 4B, during the first time period, the system terminal 330 may generate a power on/off signal PFC_ON/OFF according to the power abnormal signal AC_OK and transmit the power on/off signal PFC_ON/OFF to the power factor adjusting circuit 321. The power factor adjusting circuit 321 may stop an execution of the voltage converting operation and keep a switch SW3 in a cut-off state.

At the same time, the electric power needed by the system terminal 330 may be supplied by the capacitor C1.

It is worth mentioning that the power on/off signal PFC_ON/OFF is not necessarily provided by the system terminal 330. In other embodiments of the disclosure, the power factor adjusting circuit 321 may generate the power on/off signal PFC_ON/OFF according to the power abnormal signal AC_OK. Or when the power abnormal signal AC_OK is transmitted to outer electronic apparatuses, the power abnormal signal PFC_ON/OFF may be provided by outer electronic apparatuses and without particular limitations.

In addition, the power abnormal signal AC_OK may be used to indicate whether a cut-off state of the selected power VS1 has been happened or not. For instance, the power abnormal signal AC_OK may be a logic signal. When the power abnormal signal AC_OK is in a first logic level, the selected power VS1 is in a cut-off state; when the power abnormal signal AC_OK is in a second logic level, the selected power VS1 is in a normal (non-cutoff) state, wherein the first logic level is opposite to the second logic level. The power on/off signal PFC_ON/OFF is used to indicate the on and off of a voltage converting operation of the power factor adjusting circuit 321, wherein when the power on/off signal PFC_ON/OFF is the first logic level, the power on/off signal PFC_ON/OFF may indicate that the voltage converting operation of the power factor adjusting circuit 321 needs to be turned on, on the contrary, when the power on/off signal PFC_ON/OFF is the second logic level, the power on/off signal PFC_ON/OFF may indicate that the voltage converting operation of the power factor adjusting circuit 321 needs to be stopped.

Figure 4C:
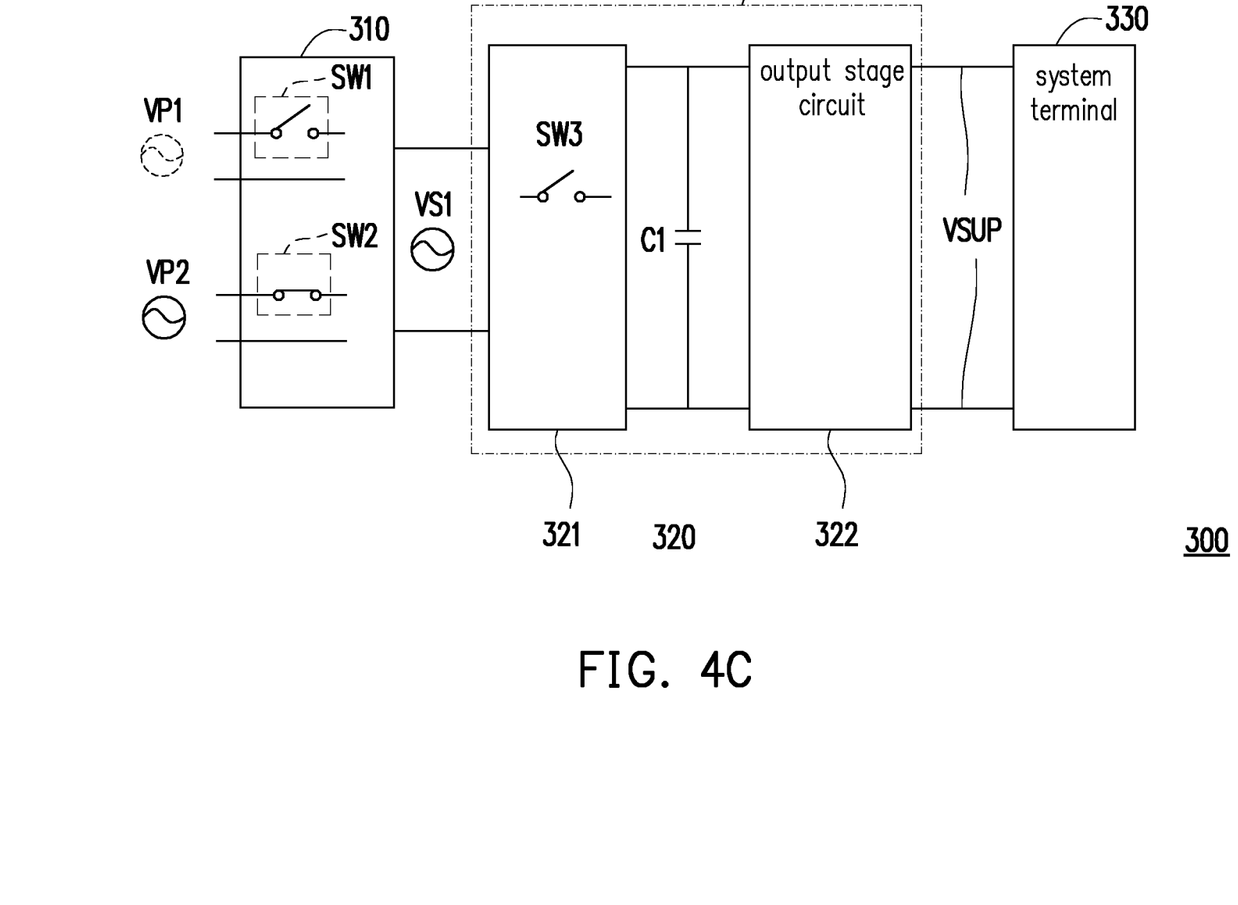

Further, please refer to FIG. 4C, during a second time period after the first time period, the switch SW2 is turned on. The power switch 310 receives the power VP2 and provides the power VP2 to generate the selected power VS1. At this moment, the selected power VS1 is recovered to the non-cutoff state.

Figure 4D:
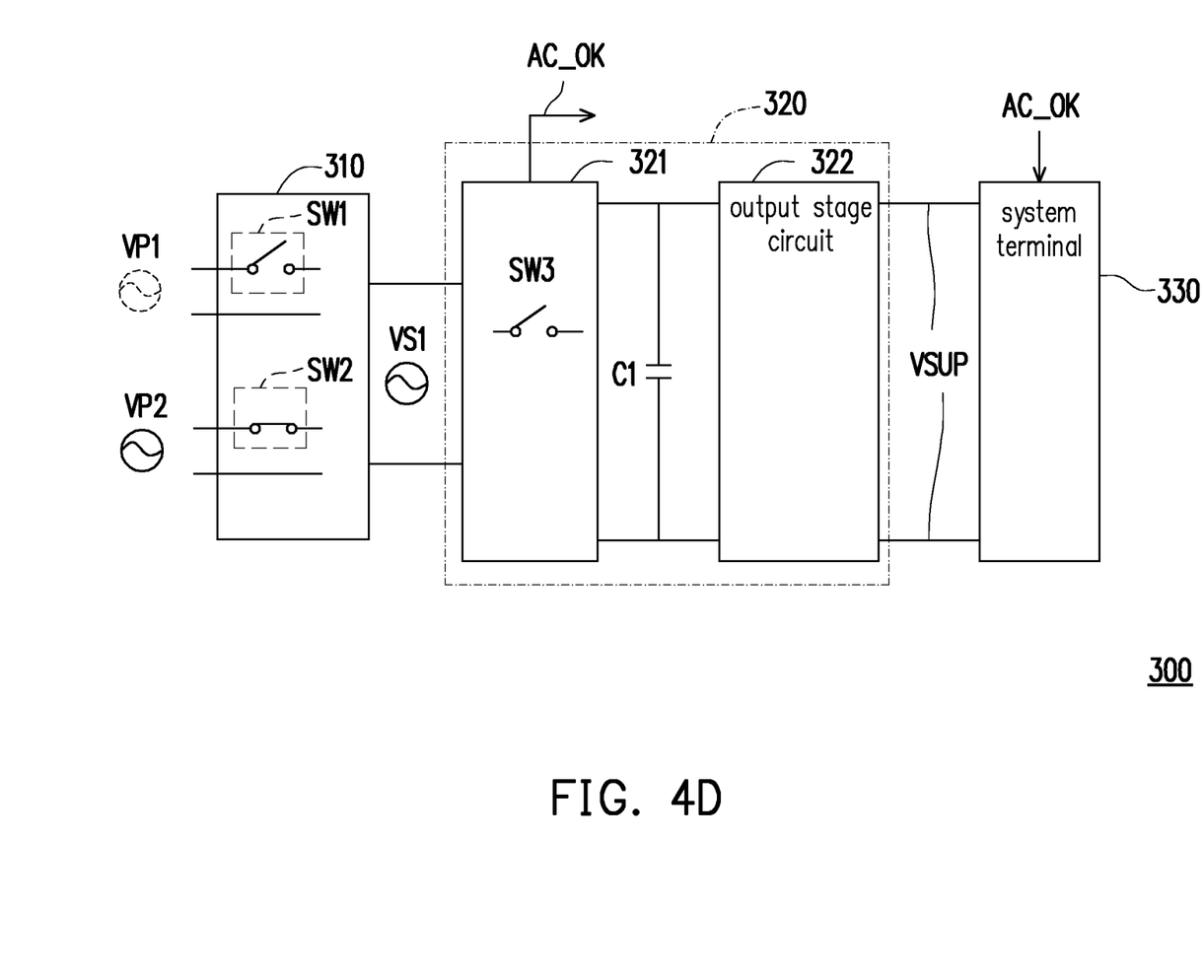
Figure 4E:
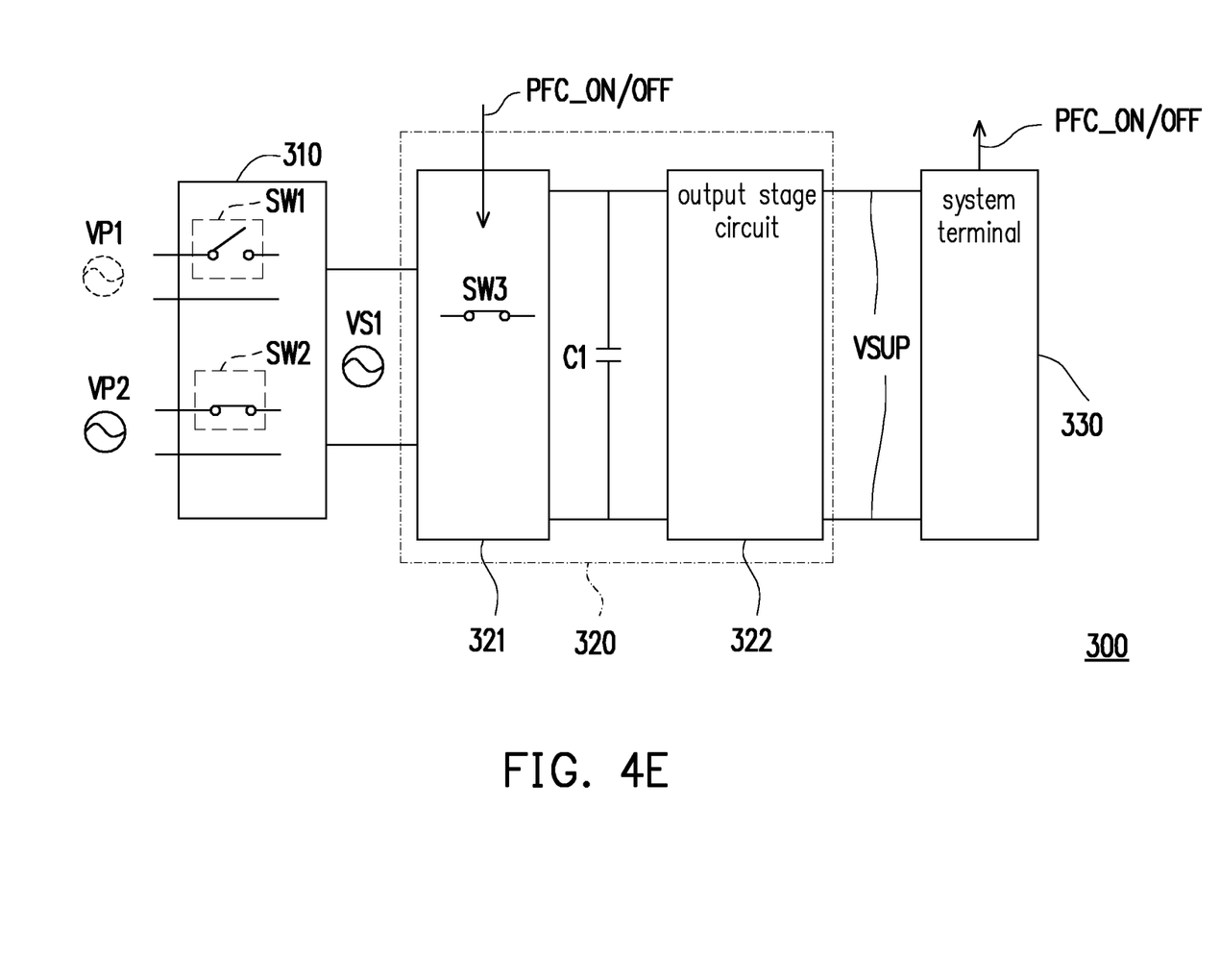

In FIG. 4D, based on the selected power VS1 is in the non-cutoff state, the power factor adjusting circuit 321 generates the power abnormal signal AC_OK such as the second logic level to indicate that the selected power VS1 is in a normal state and transmits the power abnormal signal AC_OK to the terminal system 330. In FIG. 4E, the system terminal 330 generates the power on/off signal correspondingly the power abnormal signal AC_OK indicating the selected power VS1 being in a normal state. The system terminal 330 provides the power on/off signal PFC_ON/OFF to the power factor adjusting circuit 321, so as to restart the voltage converting operation of the power factor adjusting circuit 321. At the same time, the power factor adjusting circuit 321 starts the voltage converting operation to the selected power VS1 (which equals to the power VP2) to generate the power VSUP.

It is worth noting that, in FIG. 4C, when the switch SW2 is changed from a cut-off to a turned-on state, the voltage converting operation of the power factor adjusting circuit 321 is stopped. Therefore, the switching operation of the switch SW2 at the moment may be performed under a zero current state to effectively avoid the phenomenon of electric arc and high frequency noise generated by bouncing operations.

Figure 5:
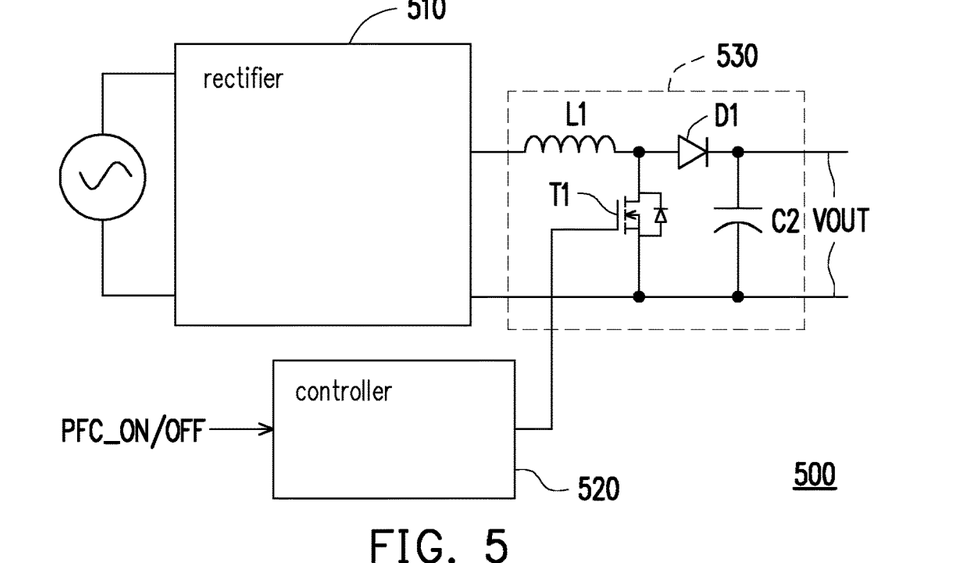
FIG. 5 shows a schematic view of an implantation way of a power factor adjusting circuit of an embodiment of the disclosure.

Please refer to FIG. 5. FIG. 5 shows a schematic view of an implementation way of a power factor adjusting circuit of an embodiment of the disclosure. A power factor adjusting circuit 500 includes a rectifier 510, a controller 520 and a voltage converter 530. The rectifier 510 receives a selected power VS1 to transfer the selected power VS1 of alternating current (AC) form to generate direct current (DC) power. The rectifier 510 may be a full bridge type, a half bridge type or a line level control (LLC) resonant converter. The voltage converter 530 includes a transistor T1, an inductor L1, a diode D1 and a capacitor C2. The transistor T1 may be used to construct a switch SW3 shown by FIG. 3. The controller 520 may provide a control signal to a gate of the transistor T1 and control the operations of cut-off and turned-on of the transistor T1. The abovementioned control signal may be a pulse width modulation (PWM) signal.

Besides, the controller 520 may receive a power on/off signal PFC_ON/OFF and keep the transistor T1 in a cut-off state when the power on/off signal PCF_ON/OFF indicates that a voltage converting operation needs to stop. On the contrary, when the power on/off signal PFC_ON/OFF indicates that the voltage converting operation needs to be switched on, the controller 520 generates the control signal to make the transistor T1 turned on and cut-off alternately and performs the boost voltage converting operation corresponding to the inductor L1 so as to generate an output power VOUT.

Figure 6:
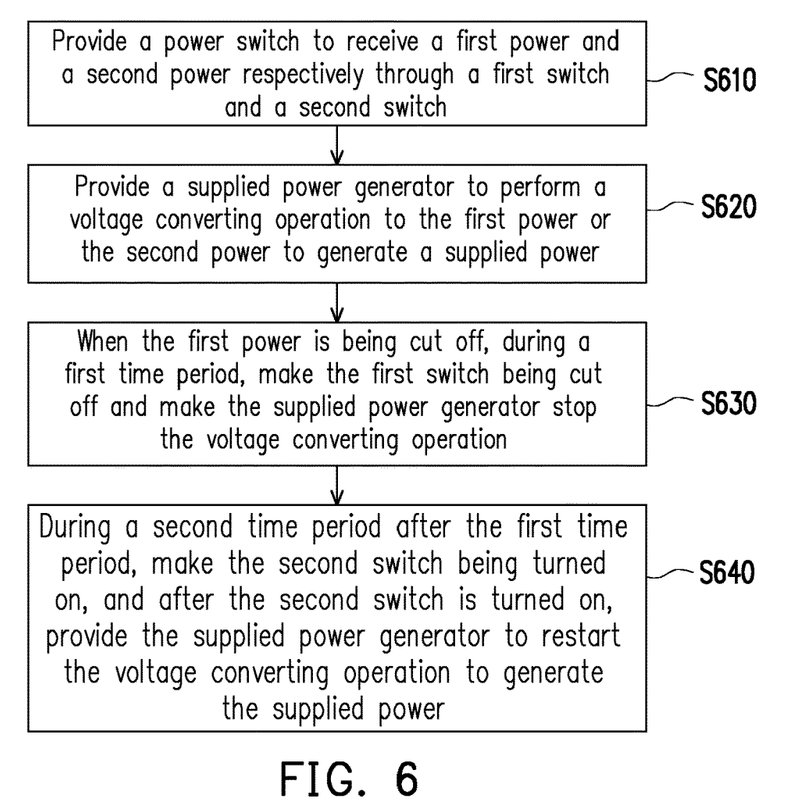
FIG. 6 shows a process chart of a power supply method of an embodiment of the disclosure.

Please refer to FIG. 6 for the following disclosure. FIG. 6 shows a process chart of a power supplying method of an embodiment of the disclosure; wherein a step S610 provides a power switch to respectively receive a first power and a second power through a first switch and a second switch; a step S620 provides a supplied power generator to perform a voltage converting operation to a first power or a second power to generate a supplied power; a step S630 makes the first switch being cut-off during a first time period and makes the supplied power generator stop the voltage converting operation when the first power is cut-off; and; a step S640 makes the second switch being turned on during a second time period after the first time period, and provides the supplied power generator to restart the voltage converting operation to generate supplied power after the second switch being turned on.

Regarding the methods and details of the implementation way of the above steps, the detailed disclosures have been described in the aforementioned embodiments and will not be described repeated here.

As described above, the disclosure performs a switching operation between powers under a condition that a voltage converting operation is stopped through making the voltage converting operation in a power supplier stop when the power is being cut off and needs to perform a power switching operation. Thereby, a zero current switch performed by switches may be achieved; and under the condition of the zero current switch, a phenomenon of electric arc may be avoided; also, a phenomenon of high frequency noise caused by switch bouncing phenomenon may be avoided.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. A power supply apparatus comprising:
a power switch receiving a first power and a second power respectively through a first switch and a second switch; and
a supplied power generator coupled to the power switch, receiving and performing a voltage converting operation to the first power or the second power to generate a supplied power,
wherein, the first switch is turned on and the second switch is cut off and the supplied power generator performs the voltage converting operation to the first power,
when the supplied power generator judges the first power as being cut off, during a first period, the first switch is cut off and the supplied power generator stops the voltage converting operation; during a second time period, the second switch is turned on and after the second switch being turned on, the supplied power generator restarts the voltage converting operation to generate the supplied power, where the first time period is before the second time period.

2. The power supply apparatus according claim 1, wherein the supplied power generator transmits a power abnormal signal when the first power is cut off.

3. The power supply apparatus according to claim 2, wherein the supplied power generator stops the voltage converting operation according to the power abnormal signal.

4. The power supply apparatus according to claim 3, wherein the power abnormal signal is transmitted to a system terminal, and the system terminal transmits a power on/off signal to the supplied power generator according to the power abnormal signal, and makes the supplied power generator stop the voltage converting operation according to the power on/off signal.

5. The power supply apparatus according to claim 4, wherein the supplied power generator stops transmitting the power abnormal signal when the second switch is turned on and the supplied power generator receives the second power.

6. The power supply apparatus according to claim 5, wherein the supplied power generator restarts the voltage converting operation after stopping transmitting the power abnormal signal.

7. The power supply apparatus according to claim 6, wherein after the power abnormal signal stops being transmitted, the system terminal changes the power on/off signal and make the supplied power generator restarts the voltage converting operation according to the power on/off signal.

8. The power supply apparatus according to claim 1, wherein the supplied power generator comprises:
a power factor adjusting circuit coupled to the power switch, receiving and performing the voltage converting operation according to the first power or the second power to generate an output power;
a capacitor coupled to the power factor adjusting circuit, saving electric energy according to the output power; and
an output stage circuit coupled to the power factor adjusting circuit, generating the supplied power according to the output power.

9. The power supply apparatus according to claim 8, wherein the power factor adjusting circuit is a boost voltage converter.

10. A power supplying method comprising:
providing a power switch to receive a first power and a second power respectively through a first switch and a second switch;
providing a supplied power generator to perform a voltage converting operation to the first power and the second power to generate a supplied power; and
providing the first switch to be turned on and the second switch to be cut off, and providing the supplied power generator to perform the voltage converting operation to the first power;
when the first power is judged as being cut off, during a first time period, making the first switch being cut off and making the supplied power generator stop the voltage converting operation; and
during a second time period after the first time period, making the second switch being turned on, and after the second switch is turned on, providing the supplied power generator restarts the voltage converting operation to generate the supplied power.

11. The power supplying method according to claim 10, wherein the steps of making the first switch being cut off and making the supplied power generator stop the voltage converting operation during the first time period when the first power is being cut off comprise:
providing the supplied power generator to transmit a power abnormal signal when the first power is cut off; and
providing the supplied power generator to stop the voltage converting operation according to the power abnormal signal.

12. The power supplying method according to claim 11, wherein the steps of providing the supplied power generator to stop the voltage converting operation according to the power abnormal signal comprise:
making the power abnormal signal being transmitted to a system terminal;
providing the system terminal to transmit a power on/off signal to the supplied power generator according to the power abnormal signal; and
providing the supplied power generator to stop the voltage converting operation according to the power on/off signal.

13. The power supplying method according to claim 12, wherein the steps of making the second switch being turned on and providing the supplied power generator to restart the voltage converting operation to generate the supplied power after the second switch is turned on comprise:
providing the supplied power generator to stop transmitting the power abnormal signal when the second switch is turned on and receives the second power; and
proving the supplied power generator to restart the voltage converting operation after stopping transmitting the power abnormal signal.

14. The power supplying method according to claim 13, wherein the steps of providing the supplied power generator to restart the voltage converting operation after stopping transmitting the power abnormal signal comprise:
providing the system terminal to change the power on/off signal after the power abnormal signal is stopped being transmitted and providing the supplied power generator to restart the voltage converting operation according to the power on/off signal.

15. The power supplying method according to claim 10, wherein the voltage converting operation is a boost voltage converting operation.

* * * * *